(12) United States Patent
Catovic et al.

(10) Patent No.: US 10,037,073 B1
(45) Date of Patent: Jul. 31, 2018

(54) EXECUTION UNIT POWER MANAGEMENT

(71) Applicant: Apple Inc., Cupertino, CA (US)

(72) Inventors: Edvin Catovic, San Francisco, CA (US); Rajat Goel, Saratoga, CA (US); Richard F. Russo, San Jose, CA (US); Matthew R. Johnson, Newark, CA (US); Shingo Suzuki, San Jose, CA (US); Pradeep Kanapathipillai, Santa Clara, CA (US); Raghava Rao V. Denduluri, Cupertino, CA (US); Pankaj Lnu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 15/273,925

(22) Filed: Sep. 23, 2016

(51) Int. Cl.
 *G06F 1/32* (2006.01)

(52) U.S. Cl.
 CPC .......... *G06F 1/3287* (2013.01); *G06F 1/3206* (2013.01); *G06F 1/3228* (2013.01)

(58) Field of Classification Search
 CPC ..... G06F 1/3287; G06F 1/3206; G06F 1/3228
 See application file for complete search history.

(56) References Cited

U.S. PATENT DOCUMENTS

| | | | | |
|---|---|---|---|---|
| 6,968,469 | B1 * | 11/2005 | Fleischmann | ......... G06F 1/3228 713/324 |
| 7,269,780 | B2 | 9/2007 | Arima et al. | |
| 8,024,591 | B2 * | 9/2011 | Bertelsen | .............. G06F 1/3203 713/323 |
| 8,140,872 | B1 | 3/2012 | Fleischmann et al. | |
| 8,713,241 | B2 | 4/2014 | Borras et al. | |
| 9,134,787 | B2 * | 9/2015 | Longnecker | .......... G06F 1/3237 |
| 9,208,755 | B2 | 12/2015 | Sharma | |
| 2016/0378168 | A1 * | 12/2016 | Branover | .............. G06F 1/3287 713/323 |

\* cited by examiner

*Primary Examiner* — Stefan Stoynov
(74) *Attorney, Agent, or Firm* — Anthony M. Petro; Meyertons, Hood, Kivlin, Kowert & Goetzel, P.C.

(57) ABSTRACT

A processor includes an instruction issue circuit, and high-utilization and low-utilization execution unit circuits coupled to execute instructions received from the instruction issue unit. On average, utilization of the low-utilization execution unit circuit is lower than utilization of the high-utilization execution unit circuit. The processor also includes a retention circuit coupled to a different power domain than the low-utilization execution unit circuit, and a power management circuit. The power management circuit may be configured to detect that inactivity of the low-utilization execution unit circuit satisfies a threshold inactivity level; upon detecting that the threshold inactivity level is satisfied, cause architecturally-visible state of the low-utilization execution unit circuit to be copied to the retention circuit; and subsequent to copying of the architecturally-visible state to the retention circuit, cause the low-utilization execution unit circuit to enter a power-off state, where the retention circuit retains stored data during the power-off state.

20 Claims, 4 Drawing Sheets

EXECUTION UNIT POWER MANAGEMENT

BACKGROUND

Technical Field

Embodiments described herein relate to the field of processor hardware design and more particularly, to techniques for power management of execution units.

Description of the Related Art

A processor is generally hardware circuitry designed to execute the instructions defined in a particular instruction set architecture (ISA) implemented by the processor, for the purpose of implementing a wide variety of functionality specified by software developers. To implement a given architecture, processors typically include a variety of types of circuits, including execution units that are designed to perform specific types of computation (e.g., to execute particular types of instruction defined by the ISA). For example, a processor may include integer execution units that are designed to execute instructions that perform integer arithmetic or logical operations, floating-point execution units designed to execute instruction that perform floating-point arithmetic, and other types of execution units designed for other computations.

Power requirements tend to substantially influence the cost and performance of a system that employs a particular integrated circuit design. For example, excessive power requirements may in turn require more expensive circuit packaging and cooling. In mobile applications, power consumption directly affects battery life and total device run time. Accordingly, the power requirements of various execution units within a processor may have far-reaching implications for system cost and performance.

SUMMARY

Systems, apparatuses, and methods for performing execution unit power management are contemplated.

In various embodiments, a processor may include an instruction issue circuit as well as a high-utilization execution unit circuit and a low-utilization execution unit circuit, each coupled to execute instructions received from the instruction issue unit. On average, utilization of the low-utilization execution unit circuit is lower than utilization of the high-utilization execution unit circuit. The processor may also include a retention circuit coupled to a different power domain than the low-utilization execution unit circuit, and a power management circuit. The power management circuit may be configured to detect that inactivity of the low-utilization execution unit circuit satisfies a threshold inactivity level; upon detecting that the threshold inactivity level is satisfied, cause architecturally-visible state of the low-utilization execution unit circuit to be copied to the retention circuit; and subsequent to copying of the architecturally-visible state to the retention circuit, cause the low-utilization execution unit circuit to enter a power-off state, where the retention circuit retains stored data during the power-off state.

Various embodiments of a system may include a memory configured to store instruction, and one or more processors configured to execute the instructions. Each of the one or more processors may include a first execution unit circuit and a second execution unit circuit, each configured to execute different types of instructions. On average, the second execution unit circuit executes instructions less frequently than the first execution unit circuit. Each of the one or more processors may further include a power management circuit that is configured to detect that the second execution unit circuit has become inactive; and upon detecting that the second execution unit circuit has become inactive, cause the second execution unit circuit to enter a power-off state, where architecturally-visible state of the second execution unit circuit is retained during the power-off state.

An embodiment of a method may include detecting that a particular one of a plurality of execution unit circuits of a processor has become inactive, and upon detecting that the particular execution unit circuit has become inactive, copying architecturally-visible state of the particular execution unit circuit to a retention circuit, where the retention circuit is coupled to a different power domain than the particular execution unit circuit. The method may also include causing the particular execution unit circuit to enter a power-off state subsequent to copying the architecturally-visible state, where the retention circuit retains stored data during the power-off state, and detecting an instruction directed to the particular execution unit circuit while the particular execution unit circuit is in the power-off state. The method may further include, upon detecting the instruction directed to the particular execution unit circuit, causing the particular execution unit circuit to enter a power-on state and to be reset; and subsequent to the particular execution unit circuit entering the power-on state and being reset, restoring the architecturally-visible state of the particular execution unit circuit from the retention circuit.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
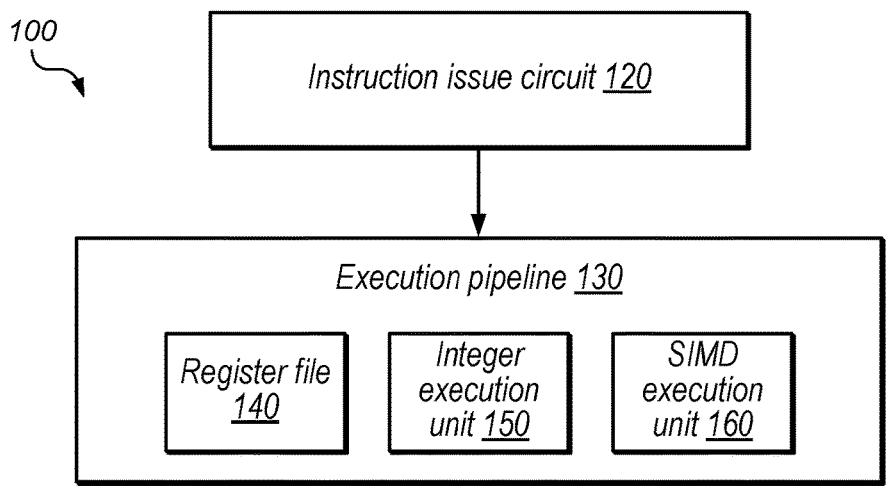
FIG. 1 is a block diagram illustrating an embodiment of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described here. It will be appreciated that for simplicity and clarity of illustration, elements shown in the figures have not necessarily been drawn to scale. For example, the dimensions of some of the elements may be exaggerated relative to other elements.

This specification includes references to "an embodiment." The appearance of the phrase "in an embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning "having the potential to"), rather than the mandatory sense (i.e., meaning "must"). Similarly, the words "include," "including," and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . " Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B. "Dependent on" may be employed as a synonym for "based on."

"In Response To." As used herein, this term is used to describe causality of events or conditions. For example, in the phrase "B occurs in response to A," there is a cause-and-effect relationship in which A causes B to occur. It is noted that this phrase does not entail that A is the only event that causes B to occur; B may also occur in response to other events or conditions that may be independent of or dependent on A. Moreover, this phrase does not foreclose the possibility that other events or conditions may also be required to cause B to occur. For example, in some instances, A alone may be sufficient to cause B to happen, whereas in other instances, A may be a necessary condition, but not a sufficient one (such as in the case that "B occurs in response to A and C").

"Each." With respect to a plurality or set of elements, the term "each" may be used to ascribe some characteristic to all the members of that plurality or set. But absent language to the contrary, use of "each" does not foreclose the possibility that other instances of the element might not include the characteristic. For example, in the phrase "a plurality of widgets, each of which exhibits property A," there must be at least two (and possibly arbitrarily many) widgets that exhibit property A. But without more, this does not foreclose the possibility of an additional widget, not a member of the plurality, that does not exhibit property A. In other words, absent language to the contrary, the term "each" does not refer to every possible instance of an element, but rather every element in a particular plurality or set.

Introduction

As noted above, an integrated circuit's power consumption may directly influence the cost of using that integrated circuit as well as limit its performance, particularly in mobile applications where battery life is an important aspect of user experience. Accordingly, it would be desirable to limit the power consumption of portions of an integrated circuit that are not being utilized at a particular time.

For example, as described in greater detail below, a processor may include a variety of execution units that are adapted to execute different types of instructions. Some types of instructions, such as generic integer arithmetic or logic instructions, may be executed frequently by many different types of computing workloads. By contrast, other types of instructions, such as instructions for performing vector arithmetic, single-instruction multiple-data (SIMD) operations, floating-point operations, cryptographic operations, or other special-purpose operations may be relatively uncommon, with the consequence that an execution unit that executes these latter instructions may be unutilized during a greater number of processor cycles, on average, than an execution unit that executes more common types of instructions. This relatively low utilization may present an opportunity for power savings, for example by powering down an execution unit when it is detected or predicted to be idle.

But powering down an execution unit may present performance costs. For example, electrical constraints on maximum current flow within an integrated circuit may limit the rate at which an execution unit can be powered up from a power-off state—that is, it may take a number of cycles to ready the execution unit for operation, during which time instructions directed to that execution unit may be stalled. Moreover, complex execution units may include architecturally-visible state, such as registers, status information, or other data that is visible to software. Correct processor operation generally requires that architecturally-visible state be saved and then restored when the processor or any of its components are powered down and then powered back up, in order to make power management transitions transparent to software. Depending on the amount of architecturally-visible state that is present in an execution unit, saving and restoring this state can be particularly time consuming, particularly if it is retained in external storage (e.g., off-processor memory).

Accordingly, the benefits of performing fine-grained power management at the level of an execution unit may come at the expense of performance, owing to the fact that transitioning the power state of an execution unit is typically not a low-latency operation. This may be exacerbated for workloads that are "bursty" in nature. For example, certain types of instructions may execute relatively infrequently, but when they do execute, they may tend to execute in groups, and they may tend to be performance-limiting. That is, even though such instructions may be relatively rare, processor design and performance goals may require that they be executed quickly when they do occur. Consequently, although it may not be possible to eliminate the performance overhead of execution unit-level power management, it may be desirable to mitigate such overhead to the extent possible, in order to achieve an acceptable compromise between power savings and performance.

In the following discussion, a general overview of an integrated circuit configured to execute instructions is first provided. Various embodiments of circuit structures and methods for performing power management at the level of an execution unit are then discussed. These embodiments may include control features for detecting execution unit inactivity, locally saving or retaining architecturally-visible state within retention circuitry, and powering down the execution unit such that the retained state is preserved, as well as powering up the execution unit and restoring architecturally-visible state when circumstances warrant. Finally, an overview is presented of a system in which such techniques may be employed.

Processor Overview

Turning now to FIG. 1, a block diagram of one embodiment of a portion of an integrated circuit 100 is shown. In various embodiments, integrated circuit 100 may correspond to a general-purpose processor, an embedded processor, a graphics processor, a digital signal processor (DSP), or any other type of processor that is generally capable of operating on digital data by executing instructions. In the illustrated embodiment, integrated circuit 100 includes an instruction issue circuit 120 coupled to an execution pipeline 130. As shown in FIG. 1, execution pipeline 130 further includes a register file 140, an integer execution unit 150, and a single-instruction, multiple data (SIMD) execution unit 160.

As a preliminary matter, it is noted that FIG. 1 is intended to illustrate several components that tend to be common to many digital integrated circuit designs. These components are illustrated at a high level of abstraction in order to facilitate the discussion of more particular features below. It is noted that integrated circuit 100 may include numerous features in addition to those shown, and may be organized in any suitable fashion beyond that shown here. In particular, it is noted that in some embodiments, integrated circuit 100 may correspond to a processor that includes multiple cores, each of which includes an instance of instruction issue circuit 120, execution pipeline 130, and possibly other components.

Instruction issue circuit 120 may generally be configured to issue instructions for execution by execution pipeline 130. In some embodiments, instruction issue circuit 120 may include or be included within instruction fetch, cache, and/or decode logic. For example, instruction issue circuit 120 may include or interact with an instruction cache that stores instructions retrieved from external storage (such as a lower level cache or system memory) well in advance of when those instructions are expected to be executed, in order to hide the latency of accessing external storage. In some embodiments, instruction issue circuit 120 or another component of integrated circuit 100 may include branch prediction circuitry, predication circuitry, or other features relating to the conditional or speculative execution of instructions.

Execution pipeline 130 may generally be configured to execute instructions issued from instruction issue circuit 120 to perform various operations. Such instructions may be defined according to an instruction set architecture (ISA), such as the x86 ISA, the PowerPC™ ISA, the ARM™ ISA, or any other suitable architecture.

In the illustrated embodiment, execution pipeline 130 includes register file 140. Register file 140 may be configured as a set of architecturally-visible registers and/or registers distinct from those specified by the ISA. For example, an ISA may specify a set of registers (such as a set of 32 64-bit registers denoted RO through R31, for example) that executable instructions may specify as the source of data operands. However, in order to implement performance-improving schemes such as register renaming, register file 140 may implement a larger number of physical registers than those defined by the ISA, allowing architectural registers to be remapped to physical registers in ways that help resolve certain types of data dependencies between instructions.

Accordingly, register file 140 may be substantially larger than the minimum set of architecturally-visible registers defined by the ISA. Moreover, register file 140 may be implemented in a multi-ported fashion in order to support multiple concurrent read and write operations by different, concurrently-executing instructions. In various embodiments, logic to perform register renaming, port scheduling and/or arbitration, or any other aspects relating to the operation of register file 140 may be included within register file 140 itself or within another unit. Further, it is noted that in some embodiments, not all architectural and/or physical registers need be implemented within register file 140; as discussed below, certain register file state (both architecturally visible and non-architecturally visible) may be implemented within one or more of the execution units themselves.

Integer execution unit 150 may be configured to carry out many of the various types of integer operations specified by a given ISA. For example, integer execution unit 150 may include combinatorial logic configured to implement various arithmetic and/or logical operations, such as integer arithmetic, Boolean operations, shift/rotate operations, or any other suitable functionality. In some embodiments, control flow instructions (e.g., branch instructions) and memory-related instructions (e.g., load and store instructions) may be executed in execution units other than integer execution unit 150, although this is not necessarily the case. If the implemented ISA supports floating-point arithmetic, such instructions may commonly (though not necessarily) be executed in a distinct execution unit, for example to permit concurrent execution of integer and floating-point instructions.

In contrast to integer execution unit 150, SIMD execution unit 160 may be configured to execute a particular subset of instructions defined within the implemented ISA, such as instructions for performing SIMD operations. In various embodiments, SIMD execution unit 160 may implement a wide datapath capable of concurrently performing a particular arithmetic, logical, or other operation on multiple distinct sets of operands. For example, SIMD execution unit 160 may implement a 128-bit wide datapath capable of concurrently performing up to 16 8-bit operations, although any suitable width and element size may be employed. In some embodiments, SIMD execution unit 160 may be able to operate on elements of variable and/or mixed size (e.g., a 128-bit datapath may be able to perform 8 16-bit operations, 4 32-bit operations, 2 64-bit operations, or mixed combinations of these). By way of example, the types of instructions SIMD execution unit 160 could execute may be found in the ARIVI™ NEON™ instruction set extensions, the various SIMD extensions to the Intel™ ISA (e.g., MMX™, SSE™ and its variants, AVX™), or any other suitable general-purpose or special-purpose ISA (including ISAs implemented by DSPs and other types of processors).

Owing to the nature of SIMD instructions, it may be the case that on average, SIMD execution unit 160 executes instructions less frequently than integer execution unit 150. For example, integer instructions may be common to many different types of computing workloads, whereas SIMD instructions may be executed only on more specialized occasions that occur less often (e.g., when processing certain types of data, such as graphical or audio data). Accordingly, SIMD execution unit 160 may be referred to as a low-utilization execution unit relative to integer execution unit 150, which may be referred to as a high-utilization execution unit.

Figure 2:
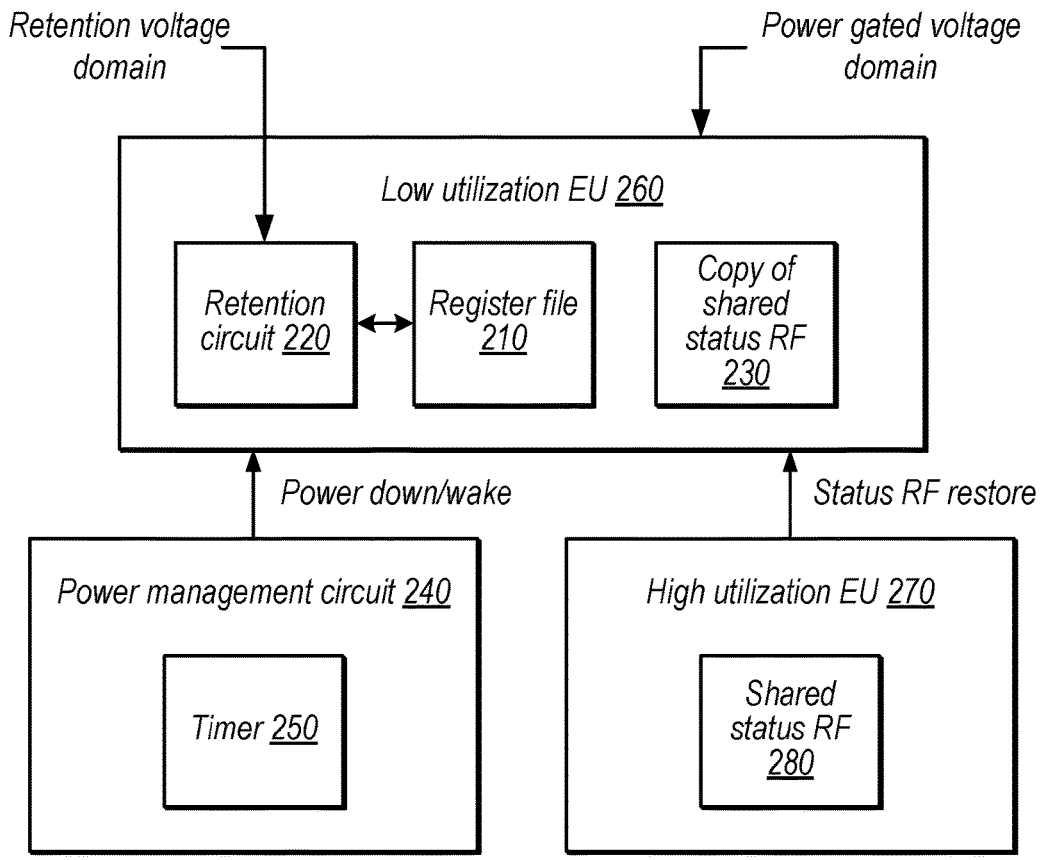
FIG. 2 is a block diagram illustrating an embodiment of a low-utilization execution unit.

FIG. 2 illustrates an embodiment of a low-utilization execution unit alongside a high-utilization execution unit, where the low-utilization execution unit includes particular power management features. Specifically, the illustrated embodiment includes low-utilization execution unit (LEU) 260 as well as high-utilization execution unit (HEU) 270. Power management circuit 240, which includes timer 250, is coupled to control power down and power up/wake functionality of LEU 260.

As shown, HEU 270 includes a shared status register file 280. In the illustrated embodiment, shared status register file 280 is coherently maintained by both HEU 270 and LEU 260, and LEU 260 includes a local copy 230 of shared status register file 280. LEU 260 further includes a register file 210 that is configured to store architecturally-visible state of LEU 260, as well as retention circuit 220. As shown, retention circuit 220 is coupled to a different voltage domain (denoted "retention voltage domain") than the voltage domain coupled to the remainder of LEU 260 (denoted "power gated voltage domain").

In some embodiments, LEU 260 may correspond to SIMD execution unit 160 of FIG. 1, and HEU 270 may correspond to integer execution unit 150. However, LEU 260 and HEU 270 are not so limited. In other embodiments, LEU 260 may be configured to perform vector operations, floating-point operations (either scalar operations, SIMD operations, or both), cryptographic operations, or other suitable types of operations instead of or in combination with SIMD operations. Similarly, HEU 270 may be configured to implement operations other than integer operations. In some embodiments, integrated circuit 100 may include a number of instances of LEU 260, which need not be identical in functionality. In such embodiments, the techniques discussed below may be independently applied to individual instances of LEU 260, such that the number of instances of LEU 260 that are powered on or off at a given time may vary depending on the operating state of integrated circuit 100.

Figure 3:
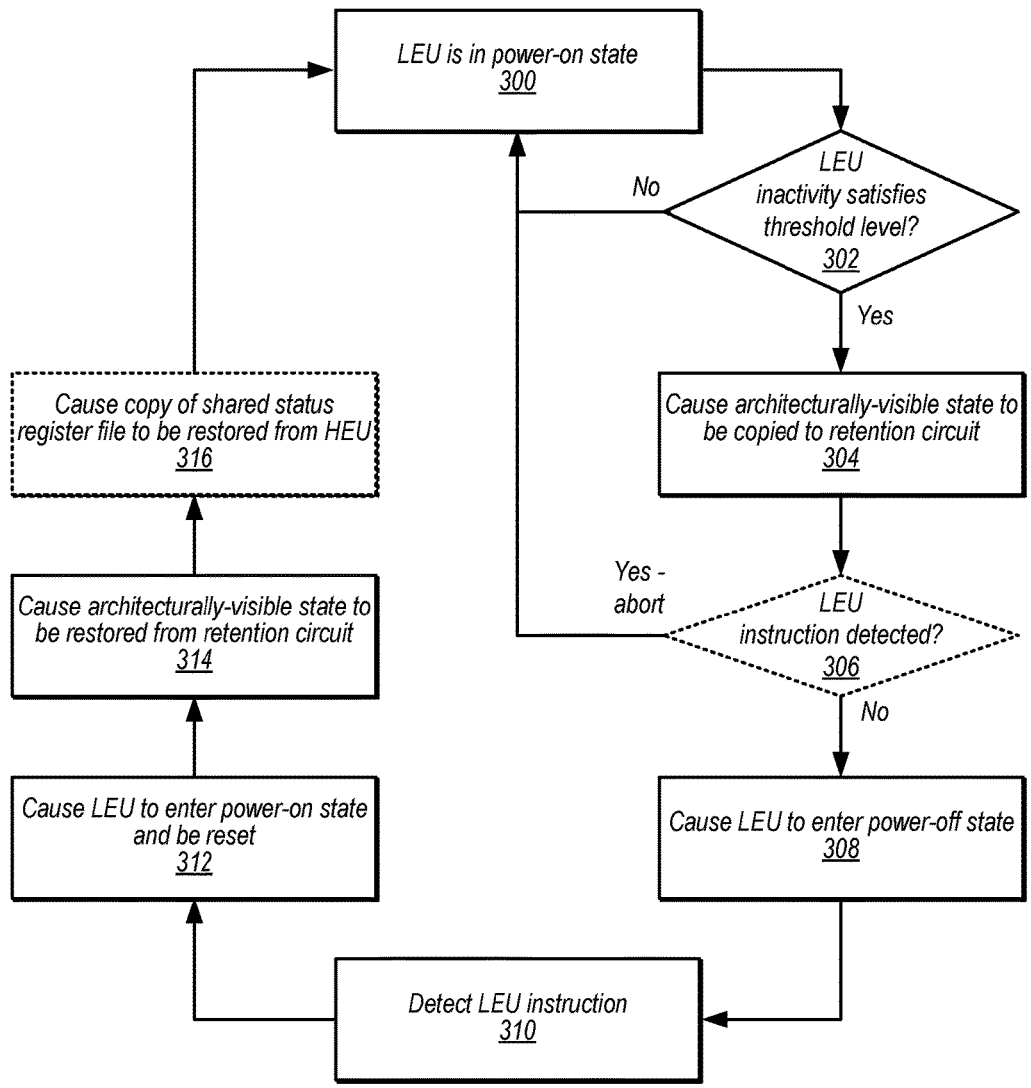
FIG. 3 is a flow diagram illustrating an embodiment of a method of operation of execution unit power management.

Operation of the configuration of FIG. 2 will now be described with reference to FIG. 3. Operation begins at block 300 where LEU 260 is in a power-on state. For example, LEU 260 may be in a normal operating mode in which it is executing instructions or is immediately ready to execute instructions.

Power management circuit 240 may detect that inactivity of LEU 260 satisfies a threshold inactivity level (block 302). In the illustrated embodiment, the threshold inactivity level may be implemented via the use of timer 250, which may be configured to adjust a timer value towards a threshold inactivity level each cycle that LEU 260 is idle (i.e., not executing any instructions), and may reset to an initial timer value each cycle that LEU 260 is active (i.e., executing one or more instructions). For example, timer 250 may be implemented as a counter, the value of which is decremented towards zero during each idle cycle, and is reset to some initial value during each active cycle. (Timer 250 may instead be configured to increment from a reset value of zero to some threshold value.) The initial value may either be the maximum value the counter is capable of representing, or some other value, and may be configured by either hardware or software during processor operation in order to adjust the length of time LEU 260 may be idle before further steps are taken. When using timer 250, power management circuit 240 may detect that inactivity of LEU 260 satisfies the threshold inactivity level when timer 250 reaches zero or some other defined threshold value.

It is noted that detecting that LEU 260 has become inactive may occur in any of a variety of manners. Broadly speaking, power management circuit 240 may detect that for at least a threshold period of time, there are no unexecuted or unretired (i.e., executed but not yet committed) instructions directed to LEU 260 within the pipeline. In some embodiments, instead of or in addition to using the timer-based approach discussed above, power management circuit 240 may be configured to predict a likelihood of LEU 260 becoming inactive dependent upon historical execution behavior of LEU 260. For example, power management circuit 240 may be configured to store one or more values indicative of past intervals of time after which LEU 260 was determined to be inactive, and may deem LEU 260 to be inactive if one or more of those intervals has been exceeded, even if a current value of timer 250 does not satisfy the threshold inactivity level. Moreover, in some embodiments, the ISA of integrated circuit 100 may support software hints (e.g., in the form of particular instructions) that, when executed, instruct power management circuit 240 to power down or power up LEU 260. Such software hints may enable LEU 260 to be deemed to be inactive and powered down when software determines that LEU 260 will not be used for a foreseeable period, which may result in powering down LEU 260 earlier than by using hardware-based techniques. Similarly, such software hints may enable LEU 260 to be deemed to be active and powered on in advance of when it is anticipated to be needed, which may improve performance by reducing the extent to which an instruction that executes on LEU 260 must stall while waiting for LEU 260 to be powered on. Other types of predictive or adaptive inactivity detection may also be employed.

In cases where multiple instances of LEU 260 are present, the determination of whether an individual instance is inactive and should be powered down may, in some embodiments, be made strictly on the activity of that individual instance (e.g., as measured by counter activity, state prediction, software hints, or other techniques). In other embodiments, however, this determination may be made based on the collective activity state of several or all instances of LEU 260. For example, when multiple instances of LEU 260 that have symmetrical or overlapping functionality are present, if the collective activity of the instances is determined to satisfy the inactivity threshold, one or more particular instances of LEU 260 may be powered down even if those instances, considered individually, would not satisfy the inactivity threshold.

Upon detecting that the threshold inactivity level of LEU 260 is satisfied, or that LEU 260 has otherwise become or is deemed to be inactive, power management circuit 240 may cause architecturally-visible state of LEU 260 to be copied to retention circuit 220 (block 304). For example, register file 210 may contain registers that correspond to architecturally-visible state (and possibly additional physical registers that contain state that is not architecturally visible). In some embodiments, power management circuit 240 may instruct LEU 260 to copy the contents of registers in register file 210 that currently correspond to architecturally-visible registers into storage locations within retention circuit 220. For example, if the ISA specifies 32 architecturally-visible registers, then retention circuit 220 may contain 32 corresponding storage locations. In some embodiments, for each architecturally-visible register, retention circuit 220 may store both a data value corresponding to the contents of the register and an index that identifies the physical register number that is assigned to the architecturally-visible register.

The actual process by which data is copied from register file 210 to retention circuit 220 may vary in various embodiments. LEU 260 may include a state machine or other control logic that is configured to identify and copy the relevant information when instructed by power management circuit 240. Alternatively, power management circuit 240 may coordinate the transfer. In some embodiments, register file 210 may include a dedicated port or other path through which to retrieve data for storage into retention circuit 220, whereas in other embodiments, this process may utilize existing ports of register file 210.

In some embodiments, after LEU 260 has been determined to be inactive but before LEU 260 has been transitioned to a power-off state, an instruction may be detected as becoming available to be issued to LEU 260 (block 306). If this case is detected, copying of architecturally-visible state to retention circuit 220 may be aborted, and operation may return to the normal power-on state of block 300 without transitioning LEU 260 to a power-off state. That is, if an instruction is issued to LEU 260 while it is in the process of transitioning to a power-off state, in some embodiments that transition may be aborted. The operation of block 306 is optional; in other embodiments, the process of powering off LEU 260 may be non-interruptible, and the issuance of an instruction during the power-off sequence may simply present an immediate wake condition as discussed in greater detail below.

Once the architecturally-visible state has been copied, in some embodiments, instruction issue logic upstream from LEU 260 may be inhibited from issuing instructions to LEU 260, and may also be inhibited from issuing instructions that reference the architecturally-visible state of LEU 260 (such as load or store instructions that reference register file 210). In other embodiments, these instructions may be allowed to issue into execution pipeline 130, but may be held in reservation stations or other structures during the period that LEU 260 is unavailable.

Subsequent to copying of architecturally-visible state to retention circuit 220, power management circuit 240 may cause LEU 260 to enter a power-off state (block 308). For example, power management circuit 240 may cause the power gated voltage domain input of LEU 260 to be driven to zero volts. In some embodiments, prior to removing power from LEU 260, power management circuit 240 may cause one or more outputs of LEU 260 to be clamped or maintained at a defined voltage level, such as zero volts. Clamping the outputs of LEU 260 to a defined voltage level may prevent erroneous or indeterminate values from being driven to other circuits when power is removed from LEU 260. While LEU 260 is in the power-off state, retention circuit 220 may retain its stored data, by virtue of being coupled to the separate retention voltage domain that remains active while LEU 260 is powered off.

While LEU 260 is in the power-off state, an instruction that is directed to LEU 260 may be detected (block 310). For example, an instruction to be executed within LEU 260, or that references the architecturally-visible state of LEU 260 (e.g., a load or store instruction that references register file 210) may be detected by instruction issue logic upstream from LEU 260. Upon detecting such an instruction, power management circuit 240 may cause LEU 260 to enter a power-on state and to be reset (block 312).

In some embodiments, an alternative wake condition may also be supported. Specifically, certain embodiments of integrated circuit 100 may support global power-down events that may cause the entirety of integrated circuit 100 to be powered down after completing an appropriate sequence to preserve global architecturally-visible state within storage external to integrated circuit 100. If LEU 260 is in a power-off state when a global power-down event request is detected, it may be necessary to cause LEU 260 to enter the power-on state and have its architecturally-visible state restored from local retention circuit 220 so that this state can be transferred off-chip along with the other relevant state of integrated circuit 100. Accordingly, in some embodiments, detection of a global power-down event request may also cause a transition to block 312, even in the absence of a particular instruction directed to LEU 260.

In certain embodiments, a global power-down event request may be implemented differently. For example, rather than unconditionally transitioning LEU 260 from a power-off state to a power-on state, detection of a global power-down event request may involve transitioning LEU 260 from a power-on state to a power-off state, or otherwise placing LEU 260 in a known power state (either on or off) prior to acknowledging the global power-down event request and allowing such a request to proceed. For example, depending on the design, the process of saving architecturally-visible state of LEU 260 described herein may be incorporated into the process of performing a global power-down event. Alternatively, the procedure for performing the global power-down event may accommodate LEU 260 being in either a power-on or a power-off state, so long as it is not in the process of transitioning between power states, or otherwise in an indeterminate power state.

After LEU 260 has entered the power-on state and has been reset, power management circuit 240 may cause the architecturally-visible state of LEU 260 to be restored from retention circuit 220 (block 314). For example, a process similar to that described above for copying state from register file 210 to retention circuit 220 may be employed, but in the reverse direction. As noted above, this process may be carried out by control logic within LEU 260, or be directly managed by power management circuit 240.

As noted above, in the embodiment of FIG. 2, LEU 260 coherently maintains a copy 230 of a shared status register file 280 located within HEU 270. In some embodiments, after its architecturally-visible state has been restored, power management circuit 240 may cause LEU 260 to restore copy 230 from shared status register file 280 (block 316). (This operation may be omitted in embodiments that do not use the shared status register file configuration described above. In embodiments where LEU 260 includes architecturally-visible status register information that is not maintained elsewhere, it is assumed here that either such status register information is included within register file 210 and will be saved and restored along with other state within register file 210, or that a separate status register file structure is also saved and restored in a manner similar to register file 210.) In some embodiments, no instructions may be allowed to dispatch to LEU 260 until both register file 210 and copy 230 have been restored. In other embodiments, instructions that do not depend on the status information in copy 230 may be allowed to dispatch to LEU 260 once register file 210 has been restored, even if copy 230 has not yet been restored.

At this stage, LEU 260 is once again fully operational in the power-on state, and operation may proceed to block 300 where the cycle may repeat if LEU 260 once again becomes inactive. In the event that the transition from the power-off to power-on state was initiated by a global power-down event request as described above, once LEU 260 returns to the power-on state with all appropriate state restored, power management circuit 240 may acknowledge the global power-down event request (e.g., by indicating that LEU 260 is ready to proceed with the event).

Figure 4:
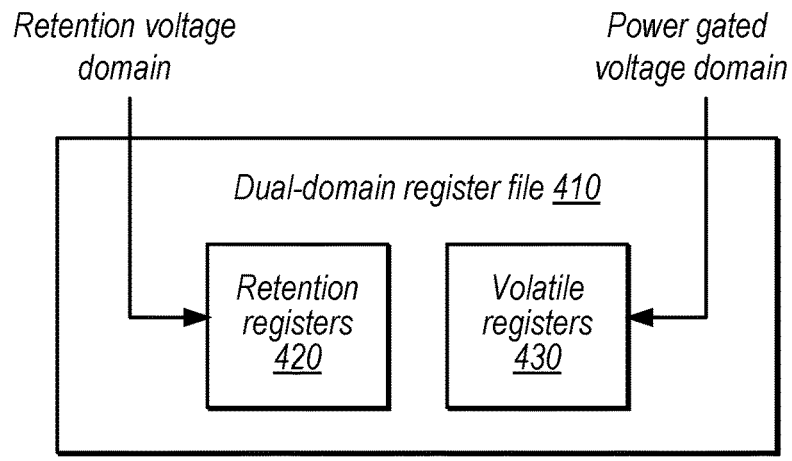
FIG. 4 is a block diagram illustrating an embodiment of a register file with integrated retention capabilities.

In the embodiment shown in FIG. 2, retention circuit 220 is shown as a distinct structure from register file 210, into which architecturally-visible state is copied prior to powering off LEU 260, and from which such state is restored upon powering on LEU 260. In other embodiments, instead of using a distinct structure, register file 210 may itself be designed to retain architecturally-visible state internally. FIG. 4 illustrates an example of a dual-domain register file 410 that may be used within LEU 260. As shown, register file 410 includes retention registers 320 that are coupled to the retention voltage domain and operable to retain their stored values when LEU 260 is in a power-off state, as well as volatile registers 330 coupled to the power gated voltage domain. In various embodiments, retention registers 320 may continually store the state of the architecturally-visible registers of LEU 260 (either as a shadow copy of corresponding volatile registers 330, or as the sole copy), or retention registers 320 may only be populated when LEU 260 has become inactive and is in the process of being powered off. In some embodiments, both the retention voltage domain and the power gated voltage domain may be coupled to each register within register file 310 via a multiplexer; when LEU 260 is powered off, the particular voltage domain coupled to a specific register may be selected dependent on whether that register currently stores architecturally-visible state. In such an implementation, architecturally-visible state may essentially be retained in place within register file 310 while LEU 260 is powered off.

Figure 5:
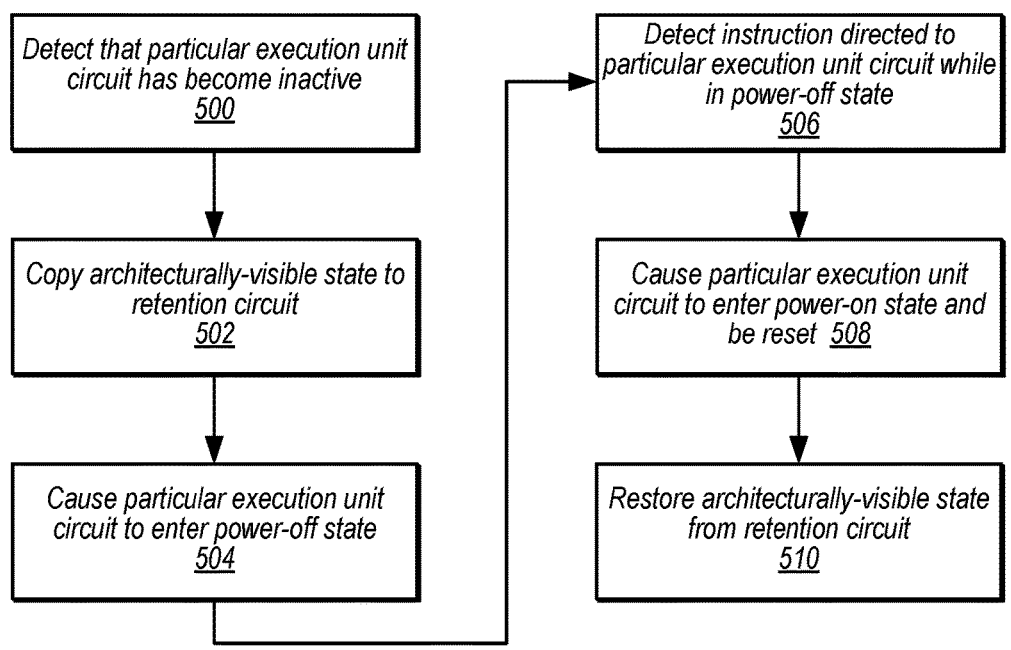
FIG. 5 is a flow diagram illustrating an embodiment of a method of execution unit power management.

The method illustrated in FIG. 5 summarizes the foregoing discussion at a higher level of generality. Operation begins in block 500 with detection that a particular execution unit circuit of a processor has become inactive. For example, detecting inactivity may include detecting that for at least a threshold period of time, there are no unexecuted or unretired instructions directed to the particular execution unit circuit within the processor, although as noted above, adaptive and/or predictive techniques may also be used to detect inactivity. An example of such detection may include power management circuit 240 detecting that LEU 260 has become inactive based on the status of timer 250, as discussed above.

Upon detecting that the particular execution unit circuit has become inactive, architecturally-visible state of the particular execution unit is copied to a retention circuit that is coupled to a different power domain than the particular execution unit circuit (block 502). For example, as discussed above, the architecturally-visible state of register file 210 may be copied to retention circuit 220 of LEU 260, although the retention circuit may also be integrated within the register file as discussed with respect to FIG. 4. Subsequent to copying the architecturally-visible state, the particular execution unit circuit is caused to enter a power-off state, where the retention circuit retains stored data during the power-off state (block 504).

While the particular execution unit circuit is in the power-off state, an instruction directed to the particular execution unit circuit is detected (block 506). Upon detecting the instruction, the particular execution unit circuit is caused to enter a power-on state and to be reset (block 508). (As noted above, other types of events, such as a global power-down event request, may also cause the particular execution unit circuit to be powered on.) Subsequent to the particular execution unit circuit entering the power-on state and being reset, the architecturally-visible state of the particular execution unit circuit is restored from the retention circuit (block 510).

Example Computing System

Figure 6:
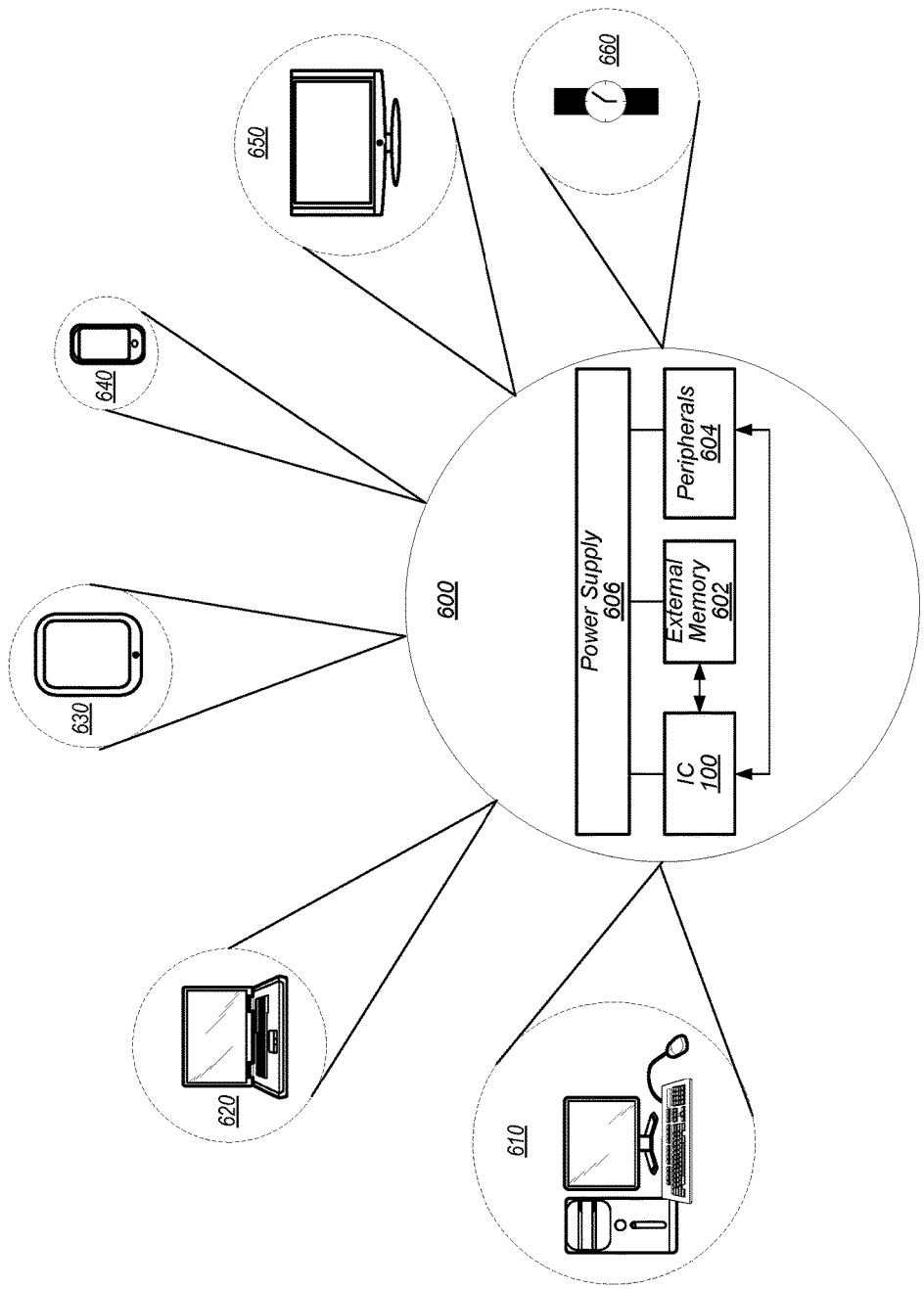
FIG. 6 is a block diagram of an embodiment of a system.

Referring next to FIG. 6, a block diagram of one embodiment of a system 600 is shown. As shown, system 600 may represent chip, circuitry, components, etc., of a desktop computer 610, laptop computer 620, tablet computer 630, cell or mobile phone 640, television 650 (or set top box configured to be coupled to a television), wrist watch or other wearable item 660, or otherwise. Other devices are possible and are contemplated. In the illustrated embodiment, the system 600 includes at least one instance of integrated circuit 100 (of FIG. 1) coupled to an external memory 602. In various embodiments, integrated circuit 100 may be a processor included within a system on chip (SoC) or larger integrated circuit (IC) which is coupled to external memory 602, peripherals 604, and power supply 606. Integrated circuit 100 may employ any of the structures or techniques described above with respect to FIGS. 2-5, or variations thereof.

Integrated circuit 100 is coupled to one or more peripherals 604 and the external memory 602. A power supply 606 is also provided which supplies the supply voltages to processor 100 as well as one or more supply voltages to the memory 602 and/or the peripherals 604. In various embodiments, power supply 606 may represent a battery (e.g., a rechargeable battery in a smart phone, laptop or tablet computer). In some embodiments, more than one instance of integrated circuit 100 may be included (and more than one external memory 602 may be included as well).

The memory 602 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing integrated circuit 100 in a chip-on-chip configuration, a package-on-package configuration, or a multi-chip module configuration.

The peripherals 604 may include any desired circuitry, depending on the type of system 600. For example, in one embodiment, peripherals 604 may include devices for various types of wireless communication, such as wifi, Bluetooth, cellular, global positioning system, etc. The peripherals 604 may also include additional storage, including RAM storage, solid state storage, or disk storage. The peripherals 604 may include user interface devices such as a display screen, including touch display screens or multi-touch display screens, keyboard or other input devices, microphones, speakers, etc.

It should be emphasized that the above-described embodiments are only non-limiting examples of implementations.

Numerous variations and modifications will become apparent to those skilled in the art once the above disclosure is fully appreciated. It is intended that the following claims be interpreted to embrace all such variations and modifications.

What is claimed is:

1. A processor, comprising:
   an instruction issue circuit;
   a high-utilization execution unit circuit and a low-utilization execution unit circuit, each coupled to execute instructions received from the instruction issue circuit, wherein on average, utilization of the low-utilization execution unit circuit is lower than utilization of the high-utilization execution unit circuit;
   a retention circuit coupled to a different power domain than the low-utilization execution unit circuit; and
   a power management circuit that is configured to:
      detect that inactivity of the low-utilization execution unit circuit satisfies a threshold inactivity level;
      upon detecting that the threshold inactivity level is satisfied, cause architecturally-visible state of the low-utilization execution unit circuit to be copied to the retention circuit; and
      subsequent to copying of the architecturally-visible state to the retention circuit, cause the low-utilization execution unit circuit to enter a power-off state, wherein the retention circuit retains stored data during the power-off state.

2. The processor of claim 1, wherein the power management circuit is further configured to:
   detect an instruction directed to the low-utilization execution unit circuit while the low-utilization execution unit circuit is in the power-off state;
   upon detecting the instruction directed to the low-utilization execution unit circuit, cause the low-utilization execution unit circuit to enter a power-on state and to be reset; and
   subsequent to the low-utilization execution unit circuit entering the power-on state and being reset, cause the architecturally-visible state of the low-utilization execution unit circuit to be restored from the retention circuit.

3. The processor of claim 1, further comprising a timer, and wherein:
   to detect inactivity, the power management circuit is further configured to evaluate the timer;
   the timer is configured to adjust its value towards the threshold inactivity level each cycle that the low-utilization execution unit circuit is idle; and
   the timer is configured to reset to an initial timer value each cycle that the low-utilization execution unit circuit is active.

4. The processor of claim 3, wherein the initial timer value is configurable during processor operation.

5. The processor of claim 1, wherein to detect that inactivity of the low-utilization execution unit circuit satisfies the threshold inactivity level, the power management circuit is further configured to predict a likelihood of the low-utilization execution unit circuit becoming inactive dependent on historical execution behavior of the low-utilization execution unit circuit.

6. The processor of claim 1, wherein the low-utilization execution unit circuit is configured to implement one or more of: vector operations, single-instruction multiple-data (SIMD) operations, floating-point operations, cryptographic operations, or any combination thereof.

7. The processor of claim 1, wherein the power management circuit is further configured to:
   subsequent to detecting that the threshold inactivity level is satisfied, and before causing the low-utilization execution unit circuit to enter the power-off state, detect that an instruction has become available to be issued to the low-utilization execution unit circuit; and
   based upon detecting the instruction, abort copying of the architecturally-visible state to the retention circuit, and prevent the low-utilization execution unit circuit from entering the power-off state.

8. The processor of claim 1, wherein:
   the low-utilization execution unit circuit includes a register file that, during operation, stores architecturally-visible and non-architecturally-visible state; and
   the retention circuit is external to the register file.

9. The processor of claim 1, wherein to cause the low-utilization execution unit circuit to enter the power-off state, the power management circuit is further configured to cause one or more outputs of the low-utilization execution unit circuit to be maintained at a defined voltage level.

10. The processor of claim 1, the power management circuit is further configured to:
    detect that a global power-down event request has occurred; and
    before acknowledging the global power-down event request, causing the low-utilization execution unit circuit to transition from the power-off state to a power-on state or from the power-on state to the power-off state.

11. A system, comprising:
    a memory configured to store instructions; and
    one or more processors configured to execute the instructions, wherein each of the one or more processors comprises:
       a first execution unit circuit and a second execution unit circuit, each configured to execute different types of instructions, wherein on average, the second execution unit circuit executes instructions less frequently than the first execution unit circuit; and
       a power management circuit that is configured to:
          detect that the second execution unit circuit has become inactive; and
          upon detecting that the second execution unit circuit has become inactive, cause the second execution unit circuit to enter a power-off state, wherein architecturally-visible state of the second execution unit circuit is retained during the power-off state.

12. The system of claim 11, wherein the power management circuit is further configured to:
    detect issue of an instruction directed to the second execution unit circuit while the second execution unit circuit is in the power-off state; and
    upon detecting issue of the instruction directed to the second execution unit circuit, cause the second execution unit circuit to enter a power-on state and to be reset.

13. The system of claim 12, wherein:
    the first execution unit circuit and the second execution unit circuit are configured to coherently maintain state of a shared status register file;
    the second execution unit circuit includes a copy of the shared status register file; and
    subsequent to the second execution unit circuit entering the power-on state and being reset, the power management circuit is further configured to cause the copy of the shared status register file to be restored from the first execution unit circuit.

14. The system of claim 11, wherein:
the second execution unit circuit includes a register file;
the register file includes a retention circuit coupled to a different power domain than the second execution unit circuit and configured to store architecturally-visible state of the second execution unit circuit, wherein the retention circuit retains stored data during the power-off state; and
the register file further includes volatile storage configured to store non-architecturally visible state of the second execution unit circuit, wherein the volatile storage does not retain stored data during the power-off state.

15. The system of claim 11, wherein to detect that the second execution unit circuit has become inactive, the power management circuit is further configured to detect that for at least a threshold period of time, there are no unexecuted or unretired instructions directed to the second execution unit circuit.

16. The system of claim 11, wherein each of the one or more processors further comprises a timer, and wherein:
to detect that the second execution unit circuit has become inactive, the power management circuit is further configured to evaluate the timer;
the timer is configured to adjust its value towards a threshold inactivity level each cycle that the second execution unit circuit is idle; and
the timer is configured to reset to an initial timer value each cycle that the second execution unit circuit is active.

17. The system of claim 11, wherein the second execution unit circuit is configured to implement one or more of: vector operations, single-instruction multiple-data (SIMD) operations, floating-point operations, cryptographic operations, or any combination thereof.

18. A method, comprising:
detecting that a particular one of a plurality of execution unit circuits of a processor has become inactive, wherein on average, the particular one of the plurality of execution unit circuits executes instructions less frequently than the rest of the plurality of execution unit circuits;
upon detecting that the particular execution unit circuit has become inactive, copying architecturally-visible state of the particular execution unit circuit to a retention circuit, wherein the retention circuit is coupled to a different power domain than the particular execution unit circuit;
subsequent to copying the architecturally-visible state, causing the particular execution unit circuit to enter a power-off state, wherein the retention circuit retains stored data during the power-off state;
detecting an instruction directed to the particular execution unit circuit while the particular execution unit circuit is in the power-off state;
upon detecting the instruction directed to the particular execution unit circuit, causing the particular execution unit circuit to enter a power-on state and to be reset; and
subsequent to the particular execution unit circuit entering the power-on state and being reset, restoring the architecturally-visible state of the particular execution unit circuit from the retention circuit.

19. The method of claim 18, wherein detecting that the particular execution unit circuit has become inactive comprises detecting that for at least a threshold period of time, there are no unexecuted or unretired instructions directed to the particular execution unit circuit.

20. The method of claim 18, wherein the particular execution unit circuit is configured to implement one or more of: vector operations, single-instruction multiple-data (SIMD) operations, floating-point operations, cryptographic operations, or any combination thereof.

* * * * *